United States Patent [19]

Bowen et al.

[11] 4,158,464
[45] Jun. 19, 1979

[54] UTENSIL HANDLE FOR USE IN MICROWAVES

[75] Inventors: Robert F. Bowen, Burlington; Palmer P. Derby, Weston, both of Mass.

[73] Assignee: Raytheon Company, Lexington, Mass.

[21] Appl. No.: 855,106

[22] Filed: Nov. 25, 1977

[51] Int. Cl.² ............................................. A47J 45/00
[52] U.S. Cl. .................................. 294/31.2; 294/27 H
[58] Field of Search .................. 294/31.2, 27 H, 27 R; 248/145.6; 215/100 A; 16/110 A, 114 R, DIG. 25; 224/45 A, 45 P, 55, 58; 222/465, 467

[56] References Cited

U.S. PATENT DOCUMENTS

| 2,991,111 | 7/1961 | Freiman | 294/31.2 |
| 3,154,227 | 10/1964 | Anderson et al. | 222/465 |
| 4,033,009 | 7/1977 | Hoinash | 294/27 H |

Primary Examiner—James B. Marbert
Attorney, Agent, or Firm—Harold A. Murphy; Joseph D. Pannone; John T. Meaney

[57] ABSTRACT

A handle for a small appliance, utensil or other body such as a coffee maker, for example, and particularly designed to be used in a microwave environment, the handle being made entirely of material which will remain cool when subjected to microwave radiation and being constructed of a ring encircling the appliance body and a gripping member fixed to the ring by a rigid inseparable joint, and a compressible member between the ring and the body which allows the handle to be applied to bodies having variations in dimensional tolerances.

15 Claims, 8 Drawing Figures

U.S. Patent  Jun. 19, 1979  Sheet 1 of 3  4,158,464
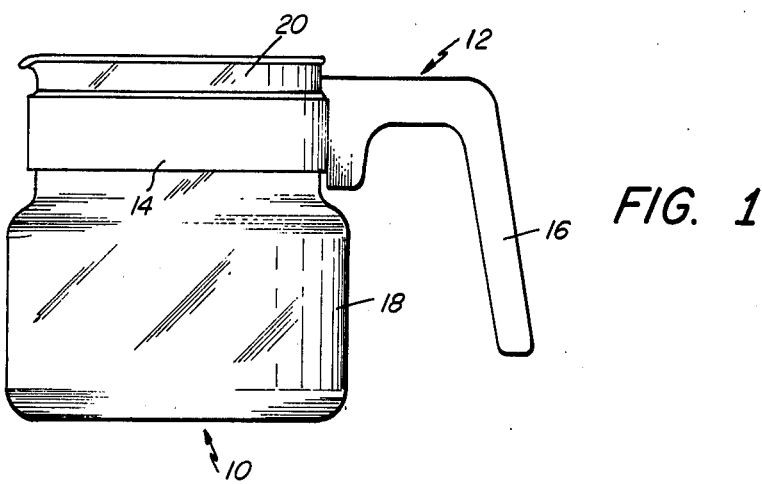
FIG. 1
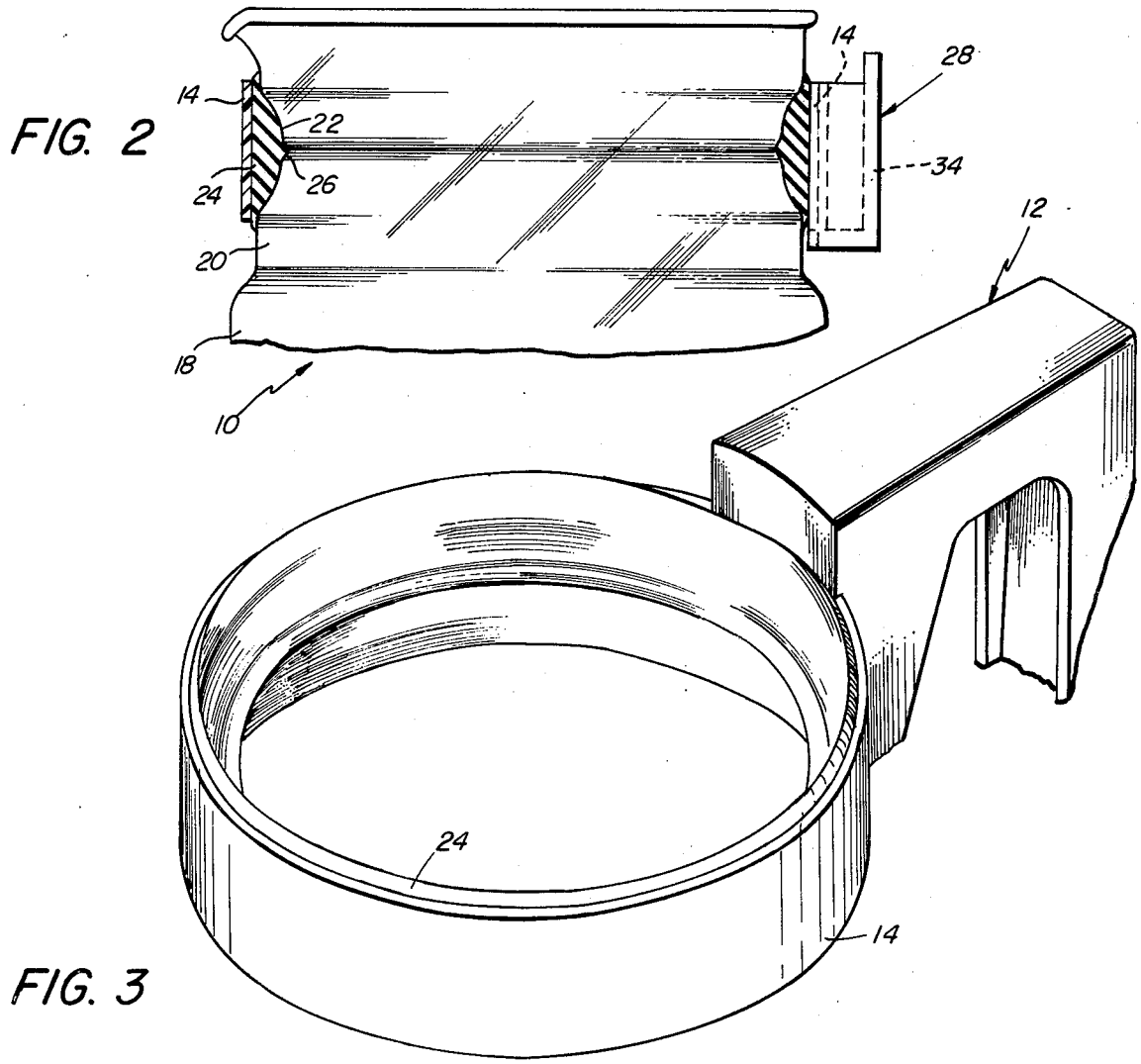
FIG. 2
FIG. 3

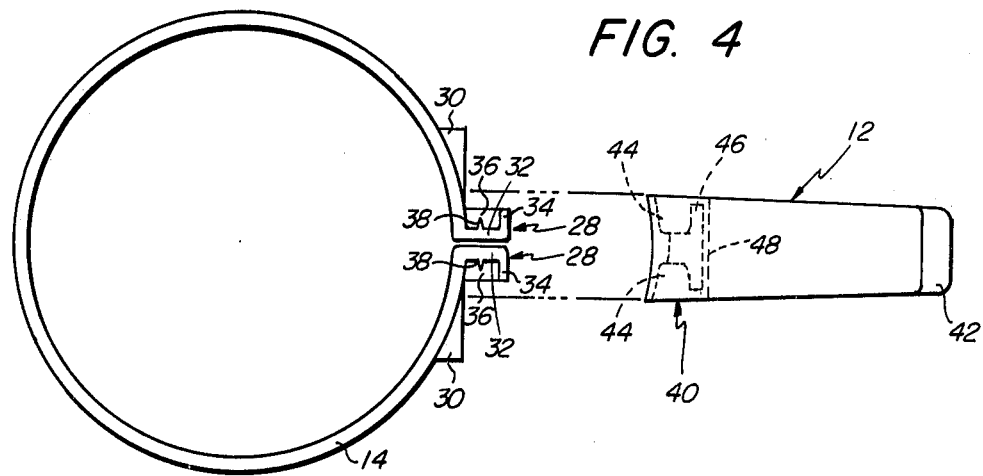
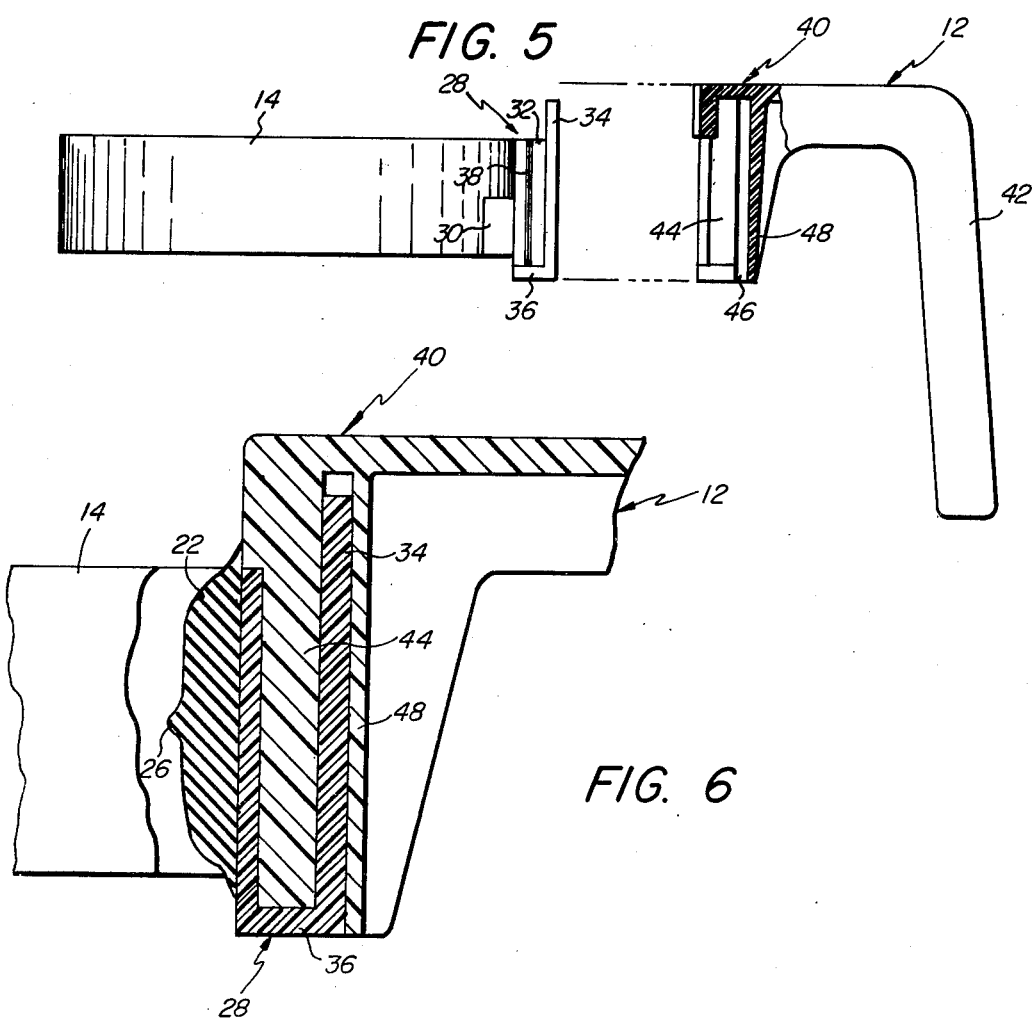

UTENSIL HANDLE FOR USE IN MICROWAVES

BACKGROUND OF THE INVENTION

It is often desirable to provide various devices such as pots, pans, and other vessels, for example, with a handle structure which will allow the device and particularly the contents therein to be heated without desirably heating the handle. This is particularly desirable in connection with devices to be used in a microwave environment.

It has become common practice to prepare hot foods, beverages and the like by subjecting them to microwave radiation in a microwave oven. Foods can be heated by merely placing them on or in conventional dishware. Beverages such as coffee, tea or the like can also be placed in conventional pots or similar containers for heating in a microwave oven.

However, it is well known that metal objects should not usually be placed in a microwave oven for the reason that the metal will absorb some of the microwave energy and consequently itself become heated and will also reflect some of the microwave energy in a manner which could cause damage to parts of the oven. Thus, it has become very difficult to design handles for glass, plastic or ceramic utensils or appliances which are to be used in a microwave environment. Most handles of conventional type are of metal or use metal components such as screws to secure the handles to the utensils.

In addition, in dealing with materials commonly used in the manufacture of utensils, such as glass and plastics which are transparent to microwaves, for example, a wide difference in thermal expansions is also encountered. By coupling the thermal expansion differences with the normally very wide manufacturing tolerances found in glass fabrication, the problems are compounded.

SUMMARY OF THE INVENTION

The present invention overcomes the foregoing and other objections to conventional handle construction by the provision of a novel handle structure designed particularly to be employed with a vessel or utensil which is to be used in a microwave environment but which may be used in other environments, if desired. The handle of this invention is fabricated substantially entirely from materials which are transparent to microwaves. Plastic, for example, is one choice of material which will function well in this design, together with non-loaded rubber, such as silicone rubber which contains no metallic or carbon particles. Such materials are also cost effective and can be mass produced by such techniques as injection molding. It is important that the material have a low dielectric loss at microwave frequencies when intended to be used in a microwave environment.

The handle comprises a plastic band which is wrapped around the body of the glass, plastic or ceramic vessel or utensil, preferably around a circumferential depression in the body. Between the plastic band and the body is an inner band of physically compressible material, such as unloaded silicone rubber or other similar material having low dielectric loss at microwave frequencies. The inner band is provided to accommodate bands and glass dimensions where relatively large dimensional variations exist due to thermal and manufacturing tolerances. The inner band has at least a minimum amount of resilience so that a spring-back effect is achieved to maintain a constant pressure on the band.

The band is shaped as a split ring and its ends each have a substantially L-shaped projection, the projections being directed away from one another. With the inner ring and band wrapped around the vessel, a handle is slipped downwardly or upwardly over the projections. The handle has a slot which received the projections, and the engaged surfaces of the slot and projections are integrally welded together to rigidly join the handle to the band.

The slot and projections may be tapered to insure a close fit and may be provided with interlocking irregularities, if desired, to further insure proper interfit.

A handle of this type will remain cool when subjected to microwave radiation, will adjust itself, within limits, to small variations in sizes of vessels, and will remain rigidly connected to a vessel during extended periods of use. The handle will also be thermally isolated from the heat which is generated by the heated contents of the vessel because of the interposition of the compressible band between the handle and the vessel.

BRIEF DESCRIPTION OF THE DRAWINGS

The above and other advantages of the invention will become apparent from the following description taken in connection with the accompanying drawings, wherein:

FIG. 1 is a front elevational view of a vessel carrying a handle embodying the invention;

FIG. 2 is an enlarged fragmentary elevational view of the vessel in FIG. 1 showing the handle structure in section;

FIG. 3 is an isometric view of the vessel and handle of FIG. 1;

FIG. 4 is a plan view showing a handle separated from the supporting band;

FIG. 5 is a side elevational view of the parts illustrated in FIG. 4 showing the handle in partial vertical section;

FIG. 6 is an enlarged vertical sectional view showing the handle assembled with a supporting ring;

DESCRIPTION OF THE PREFERRED EMBODIMENTS

Figure 7:
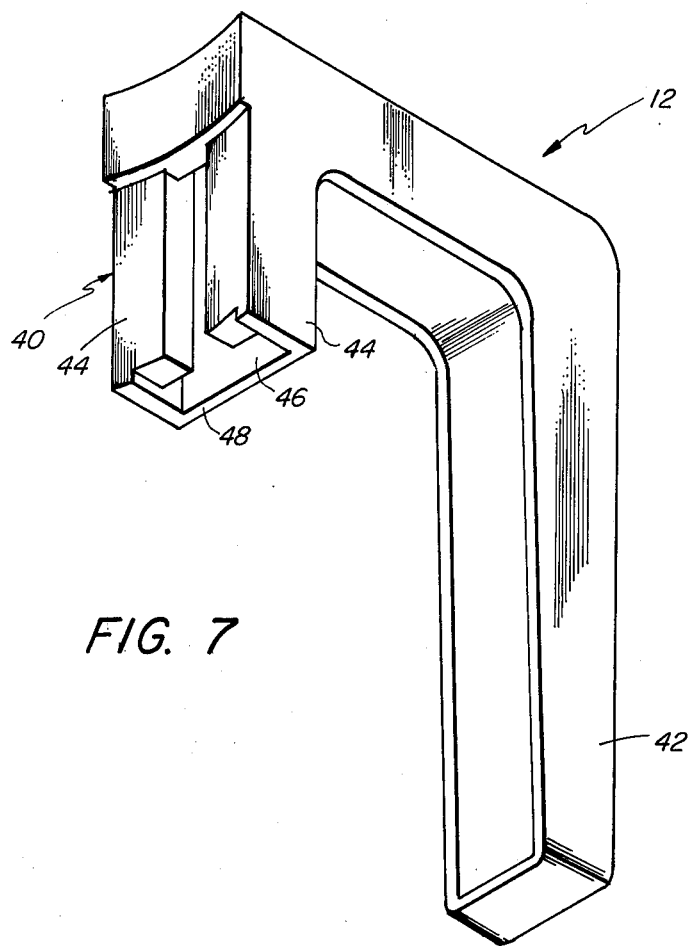
FIG. 7 is an isometric view of the handle.

Referring more particularly to the drawings wherein like characters of reference designate like parts throughout the several views, the illustration shown in FIG. 1 comprises a vessel 10 and a handle structure 12 which includes a supporting ring 14 and the handle proper 16. While it is to be understood that the handle structure of this invention may be employed with devices of any sort, in the following description the handle structure will be described particularly in connection with devices to be used in a microwave environment.

The vessel 10 may be any suitable vessel, pot, pan or utensil and is illustrated as a coffee pot having a bulbous body portion 18 and an upper neck portion 20 of smaller diameter than body portion 18. The pot is made of glass, plastic or ceramic material which has a low dielectric loss at microwave frequencies, thus making it readily transparent to microwaves.

Neck portion 20 is provided with a circumferential recess or groove 22 (FIG. 2) in which is located a compressible ring 24 preferably formed of silicone rubber or other resilient or elastic material which is also "unloaded," that is, it does not contain any metal or carbon particles. The material must have a low dielectric loss at microwave frequencies and, therefore, is readily transparent to microwaves and, like the pot 10, will remain cool when subjected to microwave radiation. The bottom of the groove 22 may be provided, if desired, with a second groove 26 which extends throughout its length and aids in retaining the compressible ring 24 properly axially positioned on the pot.

Mounted over the compressible ring 24 is the supporting ring 14 which is formed as a split ring with end portions 28 adapted to be located closely adjacent each other as shown in FIG. 4. The ring 14 is made of a relatively rigid plastic material such as polycarbonate which is transparent to microwaves. Some flexibility exists in the ring 14 which enables it to be expanded sufficiently to be slipped over the top of the pot 10 and slid down to the desired position over the compressible ring 24. Then a suitable tool or other means may be applied to pads 30 on the ring adjacent each end portion to forcibly move the portions 28 together to the position where the handle 12 can be assembled with the ring 14 as will be described. This causes the support ring to forcibly compress the underlying compressible ring 24, causing it to yieldably deform beneath the support ring 14.

The compressible ring 24 is thus able to adapt to an assembled handle and pot structure regardless of variations in dimensional tolerances which may occur from assembly to assembly. The compressible ring may be made solid or tubular and may have any desired outer surface configuration.

To enable the support ring 14 to be assembled with a handle 12, the end portions 28 are provided with parallel outwardly radially extending adjacent overlying arms 32, each arm having a rearwardly turned flange 34. Thus each end portion 28 is formed substantially U-shaped to interlock with the handle 12 as will be described. The bottom of each U-shaped end portion 12 is closed by a narrow shelf 36, and the inner side of the arms 32 of each U-shaped member is provided with a narrow vertical ridge 38.

The handle 12 is also made of microwave transparent material such as the plastic carbonate, and may have any desired overall configuration with a connecting portion 40 integrally connected to a gripping portion 42. The connecting portion 40 projects downwardly and is provided with a pair of spaced arms 44, the opening at the bases of the arms 44 being widened to form a slot 46 which is closed by a back wall 48. To assemble the handle 12 with a support ring 14, the arms 44 are slid downwardly over the end portions 28 of the support ring until the ends of the arms 44 descend to a point where they rest on the shelf 36. This locates the desired position vertically of the assembly. It will be noted that when the handle portion 40 is positioned in this manner the handle arms 44 are relatively tightly fitted on either side of the support ring arms 32 with the ridges 38 being in firm engagement with the arms 44. The flanges 34 on the ring end portions 28 extend upwardly within handle slot 46 and actually project upwardly within the body 40 as shown in FIG. 6.

To firmly secure the parts in assembled relation, the assembly is subjected to ultrasonic welding, cementing, thermal welding or solvent bonding. This causes a vibration which causes the ridges 38 to work their way frictionally into the adjacent surfaces of the handle arms 44. At the conclusion of the welding process the engaged surfaces of the handle and support ring will be found to have been securely welded together.

Figure 8:
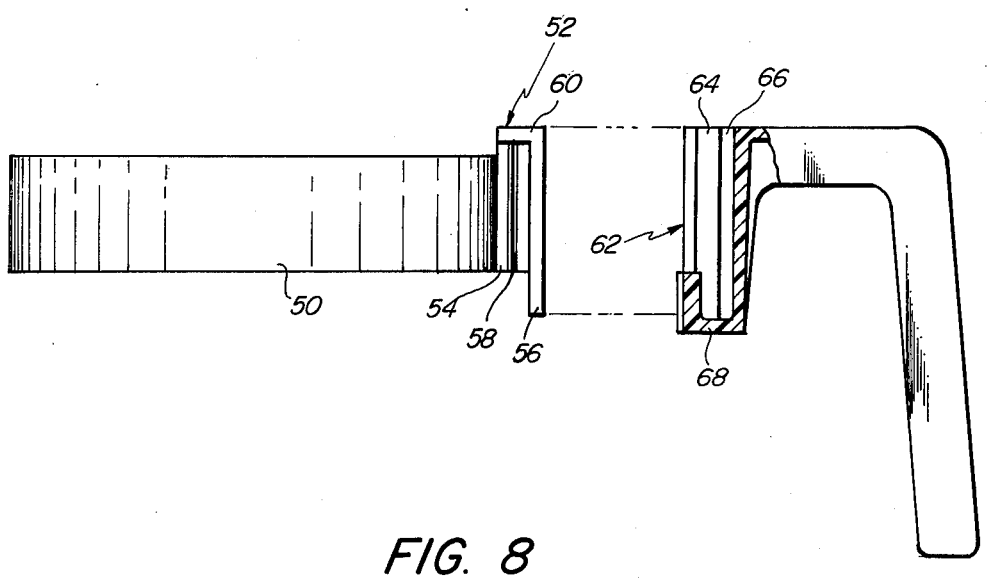
FIG. 8 is an elevational view similar to FIG. 5 showing an inverted embodiment of the invention.

In some cases the pot or vessel on which a handle is to be mounted is provided with relatively straight outer side walls. This will enable a handle to be assembled with a supporting ring by being attached from beneath rather than from above the ring. Such a handle assembly is shown in FIG. 8. Here the supporting ring 14 and handle 12 are identical except that the constructions of the end portions of the ring and of the handle connecting portion are inverted from the constructions shown in FIGS. 2–7.

For example, the supporting ring 50 in FIG. 8 has end portions 52 with arms 54, flanges 56 and ridges 58 as in the FIG. 5 structure. However, shelves 60 are disposed at the upper ends of the end portions. The handle connecting portion 62 of FIG. 8 has arms 64 and slot 66 as in the FIG. 5 structure. However, a shelf or ledge 68 closes the bottom of the slot 68. Thus, the assembly is made by sliding the connecting portion 62 upwardly on ring end portion 52 and welding the parts together.

In this embodiment, the supporting ring and the vessel on which it is mounted will not separate from the handle in the event that the welded joints inadvertently become broken while a vessel is being carried by the handle.

From the foregoing it will apparent that all of the objectives of this invention have been achieved in the handle construction shown and described. The handle and all parts associated with it, and herein included in the broad term "handle," are made of material having low dielectric loss at microwave frequencies and are, therefore, microwave transparent and include substantially no metal or carbons which would become heated when subjected to microwave radiation. The presently described handle structure is, as pointed out, adaptable to selected vessels which may be different dimensional on thermal variations and which may be used in environments other than microwave, if desired.

However, it is to be understood that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. A handle structure for supporting a device comprising a ring member shaped to encircle said device, a handle member fixedly attached to said ring member, said ring member having a first connecting portion extending radially therefrom, said handle member having a second connecting portion assembled with said first connecting portion, and means for rigidly and nondetachably securing said connecting portions together in assembled relation, said first connecting portion being provided with axially extending projections of predetermined shape, and said second connecting portion being provided with axially extending projections shaped to interfit with the projections on the first connecting portion whereby said portions may be locked together by relative sliding movement of said portions in an axial direction.

2. A handle structure as set forth in claim 1 wherein said connecting portions are fixedly bonded together.

3. A handle structure as set forth in claim 2 wherein said ring member and said handle member are made of material having a low dielectric loss at microwave frequencies.

4. A handle structure as set forth in claim 2 wherein said ring member and said handle member are made substantially entirely of material transparent to microwave radiation.

5. A handle structure as set forth in claim 2 wherein a compressible ring is disposed adjacent the inner surface of said ring member.

6. A handle structure as set forth in claim 5 wherein said ring member, handle member and compressible ring are transparent to microwave radiation.

7. A handle structure for supporting a device comprising a ring member shaped to encircle said device, and a handle member attached to said ring member, said ring member being split in the area where the handle member is attached to it to form two end portions, said end portions each having a connecting portion extending radially of the ring member, said handle member having a connecting portion shaped to interfit with the connecting portions of said ring member, and means for rigidly and undetachably securing said connecting portions together in assembled relation.

8. A handle structure as set forth in claim 7 wherein a compressible ring is disposed adjacent the inner surface of said ring member.

9. A handle structure as set forth in claim 8 wherein said end portions of the ring member are movable during assembly with a handle member toward each other to compress the compressible ring.

10. A handle structure as set forth in claim 7 wherein said connecting portions on the ring member are each provided with interlocking means, and said connecting portion of the handle member is provided with interlocking means shaped to interfit with the interlocking means on the connecting portions of the ring member.

11. A handle structure as set forth in claim 10 wherein said interlocking means on said ring member comprises axially extending grooves and flanges, and the interlocking means on the handle member comprises a lipped slot in which said flanges are disposed.

12. A handle structure as set forth in claim 11 wherein the surfaces of said grooves and flanges are fixedly bonded to the surfaces of said slot.

13. A handle structure as set forth in claim 12 wherein said ring member and said handle member are of material having low dielectric loss at microwave frequencies.

14. A handle structure as set forth in claim 12 wherein said ring member and said handle member are made substantially entirely of material transparent to microwave radiation.

15. A handle structure as set forth in claim 9 wherein said ring member, handle member and compressible ring are transparent to microwave radiation.

* * * * *